350-96.24  SR
XR 3,749,924

United States Patent
Vischulis

[11] 3,749,924
[45] July 31, 1973

[54] TARGET POSITION DETECTING DEVICE HAVING MEANS TO ADJUST RESPONSE OF PHOTOCELLS

[76] Inventor: George Vischulis, W172 N9409 Shady Ln., Menomonee Falls, Wis. 53051

[22] Filed: Oct. 29, 1971

[21] Appl. No.: 193,816

[52] U.S. Cl............. 250/227 R, 250/202, 250/204, 350/96 B
[51] Int. Cl. .............................................. G02b 5/14
[58] Field of Search ..................... 350/96 B, 96 R; 250/227, 237, 219 D, 209, 202, 220, 204; 235/61.11 E

[56] References Cited
UNITED STATES PATENTS

| | | | |
|---|---|---|---|
| 3,335,287 | 8/1967 | Hargens | 250/202 |
| 3,340,764 | 9/1967 | Bergson | 250/216 |
| 3,636,362 | 1/1972 | Beeman | 250/227 |
| 3,430,057 | 2/1969 | Genahr | 350/96 B |
| 3,198,949 | 8/1965 | Holdo | 250/202 |
| 3,666,941 | 5/1972 | Watson | 250/43.5 |
| 3,403,263 | 9/1968 | Hargens | 250/227 |
| 3,235,672 | 2/1966 | Beguin | 250/227 |
| 3,327,584 | 6/1967 | Kissinger | 350/96 B |
| 3,533,657 | 10/1970 | Da Silva | 350/96 B |

*Primary Examiner*—James W. Lawrence
*Assistant Examiner*—D. C. Nelms
*Attorney*—James E. Nilles

[57] ABSTRACT

A photoelectric position detector for a line or edge target has a plurality of detector photocells and a plurality of receiver optic fiber bundles which transmit light reflected from discrete areas of the target to the detector photocells. Adjustable screw means permit selective variation of the amount of light transmitted from each receiver optic fiber bundle to the corresponding photocell. A plurality of feedback optic fiber bundles transmit light from the illumination source to the individual detector photocells, and adjusting screw means permit selective blocking of the amount of feedback light transmitted from the feedback optic fiber bundles to the detector photocells. The feedback light adjusting means and the receiver bundle light adjusting means permits the effective illumination of all of the detector photocells to be equal, and the detector photocells are connected in an electrical circuit which assures that the response of each photocell is in exact proportion to all other detector photocells, thereby enabling the outputs of the plurality of photocells to be matched, under identical conditions of target reflectivity.

16 Claims, 34 Drawing Figures

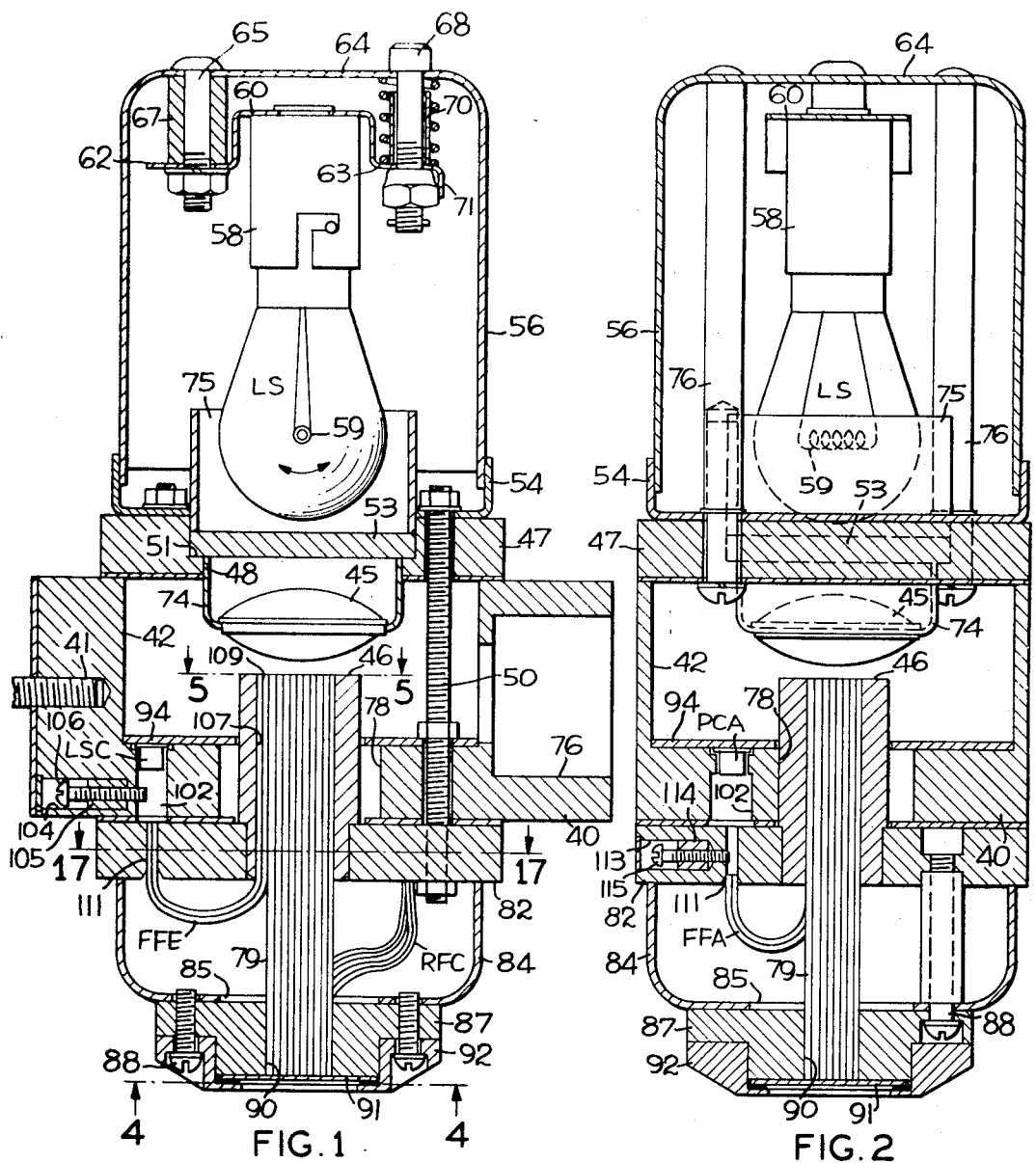

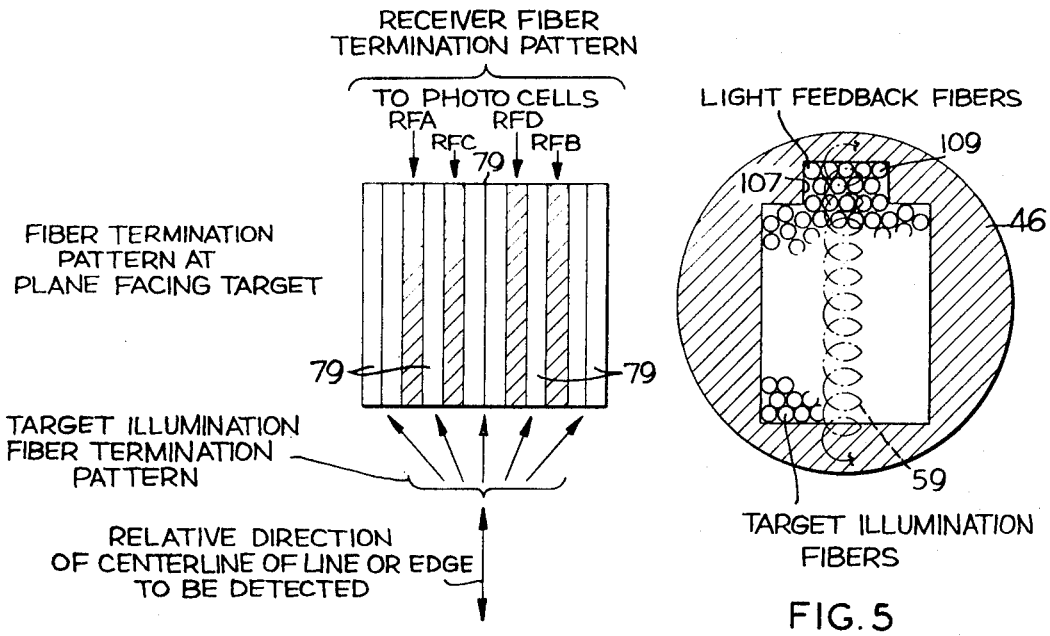
FIG. 4
FIG. 5
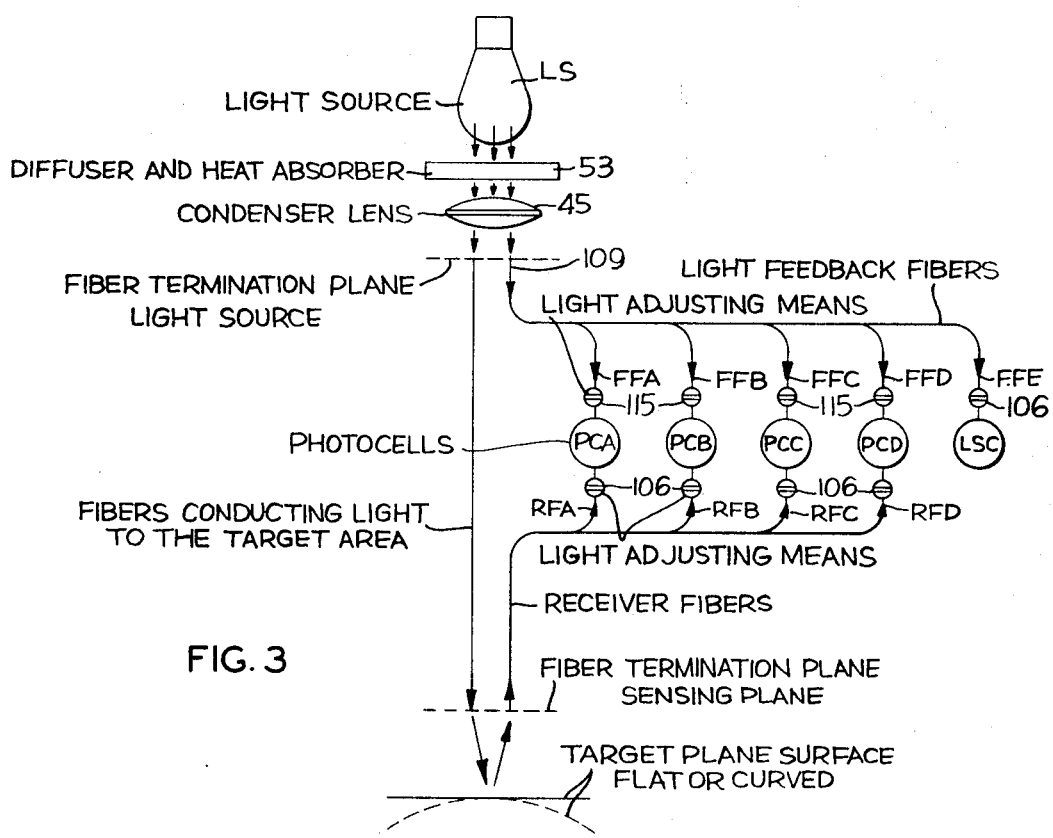
FIG. 3

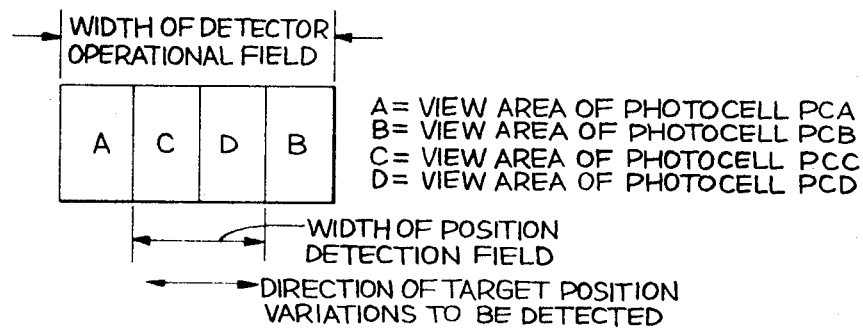
FIG. 6
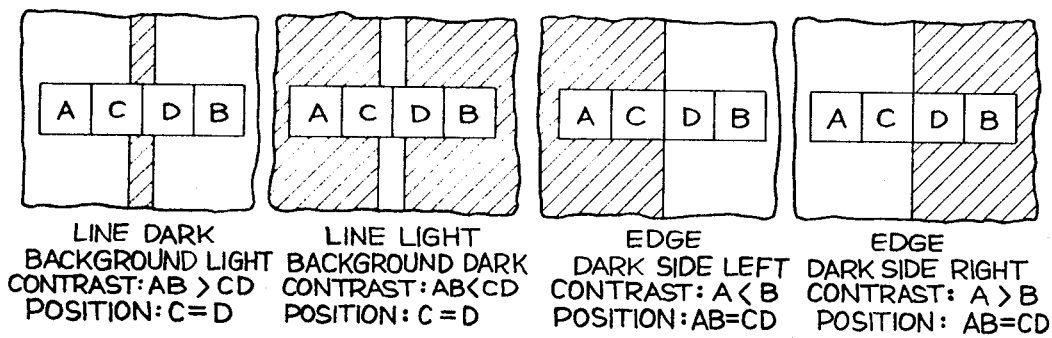
FIG. 7A — FIG. 7B — FIG. 7C — FIG. 7D
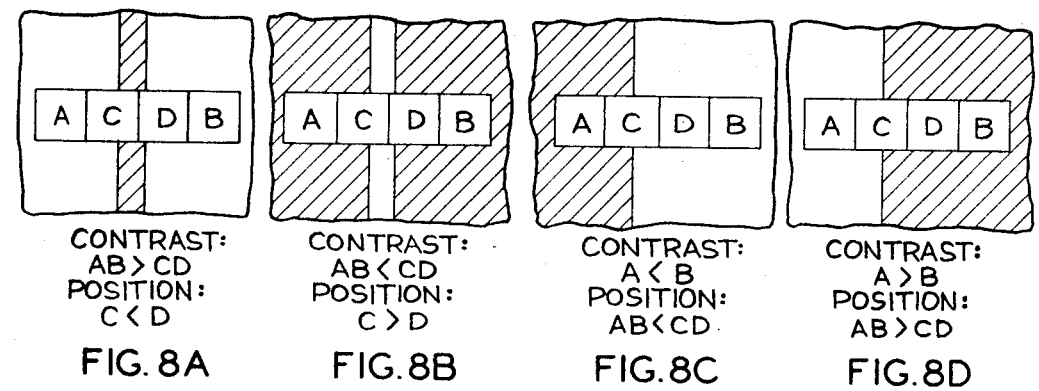
FIG. 8A — FIG. 8B — FIG. 8C — FIG. 8D
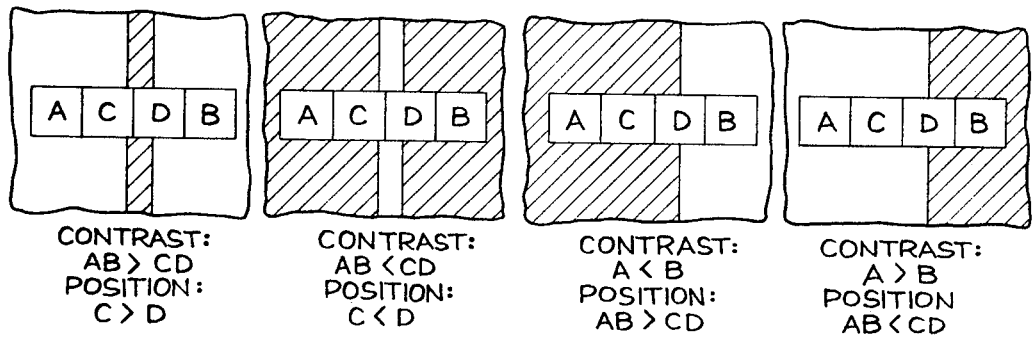
FIG. 9A — FIG. 9B — FIG. 9C — FIG. 9D

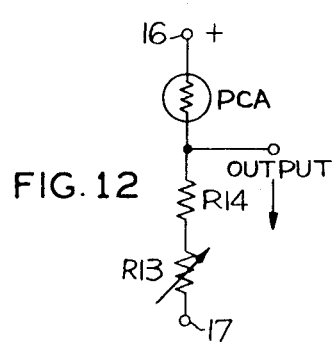
FIG.12
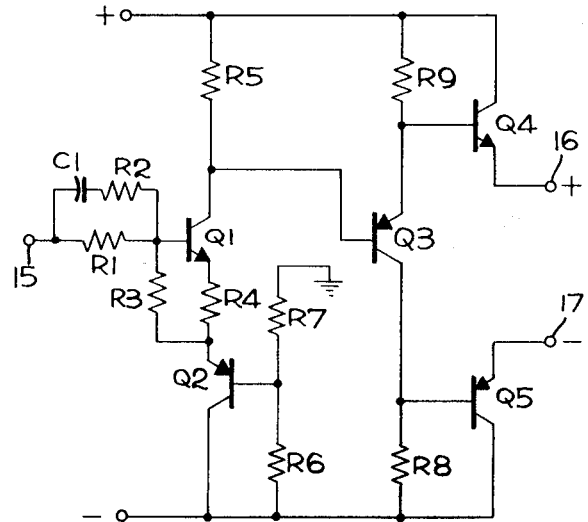
FIG.13
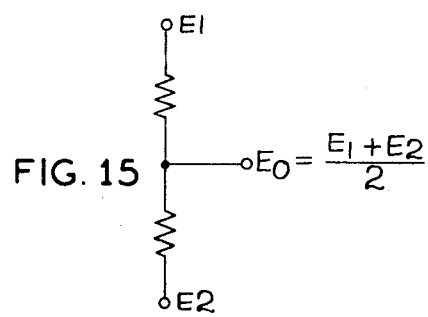
FIG.15 $E_O = \dfrac{E_1 + E_2}{2}$
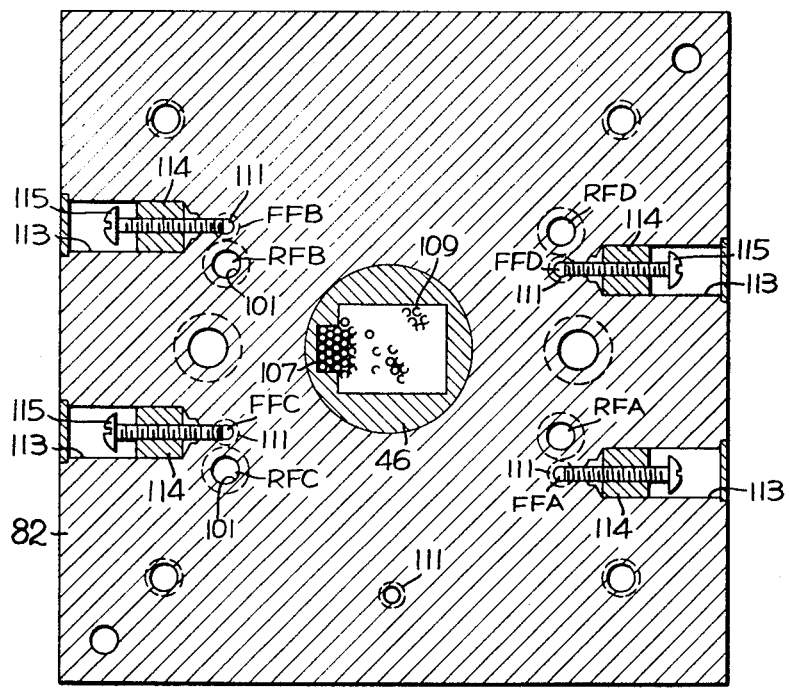
FIG.17

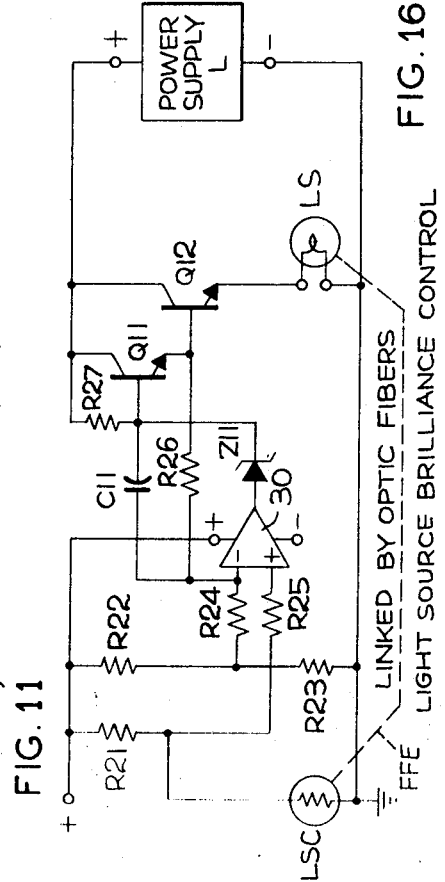

| TARGET | | | MS DETECTOR MODE | CONTRAST SIGNAL STATEMENT | POSITION SIGNAL STATEMENT | SYSTEM ELEMENT OUTPUTS AND CONDITIONS | | | | | | | |
|---|---|---|---|---|---|---|---|---|---|---|---|---|---|
| FIG. | POSITION* | | | | | 5 | 6 | PS1 | PS2 | 7 | PS3 | PS4 | 8 | OUTPUT |
| 7A | C | | LINE | AB > CD | C = D | + | − | ON | ON | ACTIVE | OFF | OFF | OFF | 0 |
| 8A | L | | LINE | AB > CD | C < D | + | − | ON | ON | ACTIVE | OFF | OFF | OFF | + |
| 9A | R | | LINE | AB > CD | C > D | + | − | ON | ON | ACTIVE | OFF | OFF | OFF | − |
| 7B | C | | LINE | AB < CD | C = D | − | + | OFF | OFF | OFF | ON | ON | ACTIVE | 0 |
| 8B | L | | LINE | AB < CD | C > D | − | + | OFF | OFF | OFF | ON | ON | ACTIVE | + |
| 9B | R | | LINE | AB < CD | C < D | − | + | OFF | OFF | OFF | ON | ON | ACTIVE | − |
| 7C | C | | EDGE | A < B | AB = CD | + | − | ON | ON | ACTIVE | OFF | OFF | OFF | 0 |
| 8C | L | | EDGE | A < B | AB < CD | + | − | ON | ON | ACTIVE | OFF | OFF | OFF | + |
| 9C | R | | EDGE | A < B | AB > CD | + | − | ON | ON | ACTIVE | OFF | OFF | OFF | − |
| 7D | C | | EDGE | A > B | AB = CD | − | + | OFF | OFF | OFF | ON | ON | ACTIVE | 0 |
| 8D | L | | EDGE | A > B | AB > CD | − | + | OFF | OFF | OFF | ON | ON | ACTIVE | + |
| 9D | R | | EDGE | A > B | AB < CD | − | + | OFF | OFF | OFF | ON | ON | ACTIVE | − |

*C = CENTERED, L = LEFT OF CENTER, R = RIGHT OF CENTER

FIG. 11

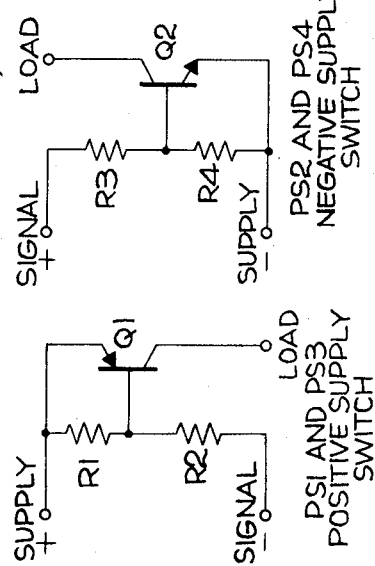

FIG. 14A  PS1 AND PS3 POSITIVE SUPPLY SWITCH

FIG. 14B  PS2 AND PS4 NEGATIVE SUPPLY SWITCH

FIG. 16  LIGHT SOURCE BRILLIANCE CONTROL

TARGET POSITION DETECTING DEVICE HAVING MEANS TO ADJUST RESPONSE OF PHOTOCELLS

This invention relates to apparatus for detecting the position of a line or edge target such as may be formed by printed areas of different reflectivity and for deriving an electrical output signal which is a function of the deviation of the target from a reference position.

BACKGROUND OF THE INVENTION

Apparatus for monitoring an edge or line target formed by printed areas of different reflectivity is known for such purposes as photoelectric control of a longitudinally transported web, but such prior art detecting devices have not been entirely satisfactory. Should there be any change in the intensity of the light received by a photocell detector other than that resulting from deviation of the target from the centerline reference position, the lateral position of the target will be adjusted by the control system in an effort to correct the light variation. After such movement, the position of the target will vary from the reference position and will be in error. Known edge or line target position detectors do not adequately compensate for variations in light intensity encountered in use resulting from changes in contrast, reflectivity or transmissibility, width of the target, or ambient light conditions. Known line or edge target sensing apparatus is incapable of monitoring a target in which wide variations in reflectivity occur or on which widely different patterns are printed because the resulting wide variances in gain, which are unrelated to target positions, cause instability of the closed loop control system.

The detector photocells of prior art line or edge target positions snesing devices do not respond identically to a given illumination level. Such unequal response results from such causes as: (1) the resistance versus illumination characteristic series from cell to cell because of variations in physical construction of the cell active area and in transmissibility of protective coatings and windows due to manufacturing tolerances; (2) the detector photocells do not receive the same amount of ambient illumination which finds its way to the photocells by means of optic fiber leakage and scatter and reflection from lenses and protective glass, and (3) the effective transmission area of the illuminating and receiver optic fibers vary. Further, because the characteristic response of the photocells is approximately a logarithmic function, electrical parameter adjustment alone cannot accomplish the precision curve matching required if the photocells are operated over different illumination level ranges.

SUMMARY OF THE INVENTION

The present invention provides an improved optical detecting system having a plurality of detector photocells in which all of the photocells respond in an identical manner to a given level of illumination.

Another aspect of the invention is to provide an optical detecting system having means to expose each of a plurality of detector photocells, which receives light reflected from a target, to identical effective illumination. A still further object is to provide such an optical detecting system in which the effective illumination of the plurality of detector photocells is equal and the response of each photocell is in exact proportion to that of all other photocells even though the individual photocells do not have the same basic resistance.

A still further aspect of the invention is to provide such an improved line or edge target position detecting system having means to adjust the amount of light reflected from the target received by the individual photocells. Still another object is to provide such an improved position detecting system having means to adjust the amount of ambient light received by the individual photocells.

Another aspect of the invention provides an improved optical detecting system with a plurality of detector photocells and having means to regulate the range of photocell output voltage for a given change in effective illumination. A still further object of the invention is to provide such an improved optical detecting system having means to regulate both the range of photocell output voltage and the level of photocell output voltage.

The line or edge target position detector of the invention has a plurality of receiver optic fiber bundles which transmit light reflected from discrete areas of the target to the individual photocells and means for selectively adjusting the amount of light transmitted from each receiver optic fiber bundle to the corresponding photocell. A plurality of feedback optic fiber bundles transmit light from the illumination source to the individual photocells, and means are provided to selectively regulate the amount of light transmitted from each feedback fiber bundle to the corresponding photocell. The receiver fiber light adjusting means and the feedback fiber adjusting means assures that all photocells receive the same effective illumination and also permits regulation of both the range and the level of the photocell output voltage. The detector photocells are connected in an electrical circuit which assures that the response of each photocell is in exact proportion to all other photocells, thereby enabling their outputs to be matched under identical conditions of target reflectivity.

These and other objects and advantages of the present invention will appear hereinafter as this disclosure progresses, reference being had to the accompanying drawings.

DESCRIPTION OF THE DRAWINGS

FIG. 1 is a vertical section view through the scanning head of a preferred embodiment of the invention;

FIG. 2 is a vertical sectional view through the scanning head of FIG. 1, taken at right angles thereto;

FIG. 3 is a schematic view of the light paths in the scanning head of FIG. 1;

FIG. 4 is a view taken along line 4—4 in FIG. 1 showing the termination pattern of the illumination and receiver optic fibers at the plane facing the target;

FIG. 5 is a view taken along line 5—5 in FIG. 1 showing the termination pattern of the illumination and feedback optic fibers at the plane facing the condenser lens;

FIG. 6 schematically illustrates the areas viewed by the four detector photocells in the scanning head of FIG. 1;

FIGS. 7A, 7B, 7C and 7D show the areas viewed by the four detector photocells with a target centered at the reference position within the position detection field when the target is respectively: (a) a dark (low reflectivity or transparent) line on a relatively light (high reflectivity) background; (b) a light (high reflectivity) line on a relatively dark (or transparent) background; (c) a right edge; and (d) a left edge;

FIGS. 8A, 8B, 8C and 8D are views similar to FIGS. 7A, 7B, 7C and 7D, respectively, but with the target to the left of the centerline reference position;

FIGS. 9A, 9B, 9C and 9D are views similar to FIGS. 7A, 7B, 7C and 7D, respectively, but with the target to the right of the centerline reference position;

FIG. 11 is a logic table showing the polarity and conditions of elements of the circuit of FIG. 10 for each of the targets and target positions represented in FIGS. 7A–7D, 8A–8D and 9A–9D;

FIG. 12 is a schematic circuit diagram of a single photocell adjusting network of the circuit of FIG. 10;

FIG. 13 is a schematic circuit diagram of the automatic gain control shown in block form in FIG. 10;

FIGS. 14A and 14B are schematic circuit diagrams of power supply switches PS1-PS4 shown in block form in FIG. 10;

FIG. 15 is a schematic circuit diagram of the photocell signal summing networks AB and CD shown in block form in FIG. 10;

FIG. 16 is a schematic circuit diagram of the means for maintaining the light source lamp at a constant light output;

FIG. 17 is a view taken along line 17—17 of FIG. 1;

GENERAL

Figure 10:
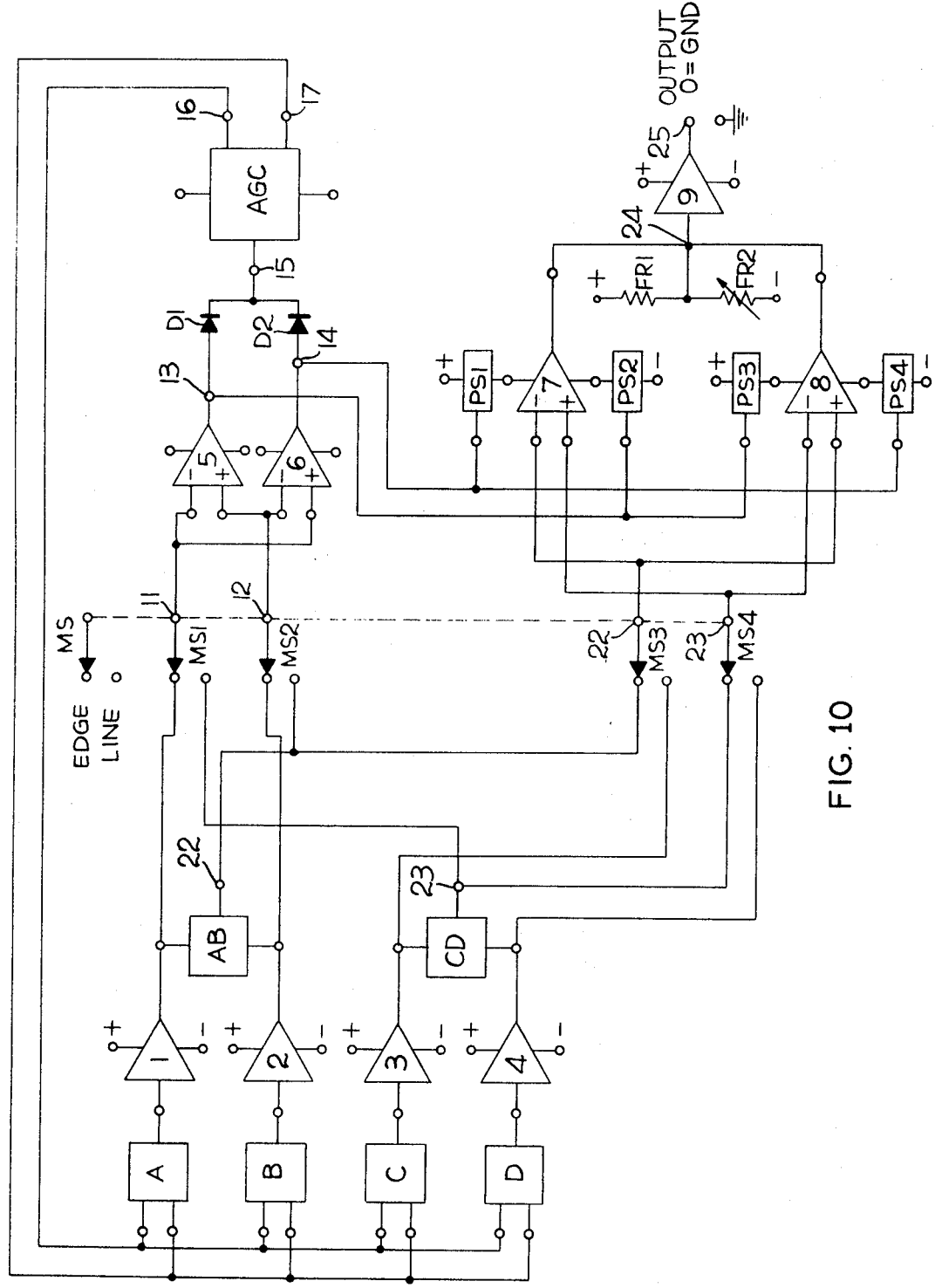
FIG. 10 is a schematic circuit diagram in block form of a preferred embodiment of the invention.

Reference may be had if deemed necessary or desirable to applicant's co-pending application Ser. No. 193,822, filed Oct. 19, 1971 which will issue as U.S. Pat. No. 3,718,821 on Feb. 27, 1973 and is entitled "Automatic Adjusting Photoelectric Position Detector." Reference may also be had if deemed necessary or desirable to applicant's co-pending application Ser. No. 193,884, filed Oct. 29, 1971 and entitled "Optical Detecting Head."

DESCRIPTION OF A PREFERRED EMBODIMENT

SCANNING HEAD

The scanning head of the preferred embodiment of the invention shown in FIGS. 1 and 2 detects the position of a line or edge target such as formed by printed areas of different reflectivity or by the edge of a longitudinally transported web and includes a generally box-shaped body 40 which may be supported by pairs of mounting studs 41 extending horizontally from opposed sidewalls thereof. Body 40 has an upwardly facing square recess 42 therein which encloses a condenser lens 45 and the upper end of a tubular optics conduit 46 having its axis aligned with the optical axis of lens 45. A square light source base 47 having a central aperture 48 therethrough is secured to body 40 by bolts 50 extending through clearance holes in body 40. Light source base 47 has an annular horizontal shoulder 51 around the margin of aperture 48 which supports a heat absorbing diffuser glass 53 above condenser lens 45. A cup-shaped light source housing guide 54 is secured above base 47 by the through bolts 50, and an inverted cup-shaped light source housing 56 fits within housing guide 54.

A light source lamp LS is removably secured within a lamp mounting socket 58 so that lamp LS is positioned above diffuser 53 and lens 45. Lamp LS preferably has a spirally wound, elongated but narrow filament 59 shown in FIGS. 1, 2 and 5. Socket 58 is affixed to a U-shaped bracket 60 having flexible legs and portions 62 and 63 extending horizontally from the legs thereof and being so oriented that the elongated dimension of filament 59 is parallel to the reference position centerline as shown schematically in FIG. 5 and described hereinafter. Portion 62 is affixed to the top wall 64 of light source housing 56 by a screw 65 extending through top wall 64 and surrounded by a tubular spacer 67 disposed between the top wall 64 and portion 62. The vertical position of horizontal portion 63 of bracket 60 may be selectively changed by a position adjusting screw 68 to move the filament 59 of lamp LS from side to side in a direction transverse to the reference position centerline and thus adjust the position of the lamp filament 59 relative to condenser lens 45. Lamp position adjusting screw 68 extends through clearance holes in top wall 64 and in horizontal portion 63 and is engaged by a nut beneath portion 63. A compression spring 70 surrounding adjusting screw 68 urges horizontal portion 63 away from top wall 64. A depending lip 71 on portion 63 engages the nut on adjusting screw 68 and prevents the nut from turning, and it will be apparent that turning of adjusting screw 68 moves horizontal portion 63 of bracket 60 toward or away from top wall 64 to adjust the position of lamp LS. Adjustment for major changes of filament location from lamp to lamp are accomplished by lamp positioning adjusting screw 68.

A light reflector tube 75 surrounds lamp LS and fits within opening 48 in light source base 47 above the heat absorbing diffuser 53. Reflector tube 75 reflects light from filament 59 downward to the edges of diffuser 53 to provide relatively constant illumination across the detector operational field.

Condenser lens 45 is secured to a cup-shaped lens housing 74 which is supported by threaded vertical studs 76 (see FIG. 2) from the top wall 64 of light source housing 56.

The square recess 42 in body 40 communicates with a horizontally extending circular entrance opening 77 in body 40 which receives an electrical cable. Body 40 also has a vertically extending cylindrical aperture 78 communicating with recess 42 which receives the tubular optics conduit 46. The optics conduit 46 has a central opening of generally rectangular cross section through which a bundle of target illuminating optic fibers 79 extend for illuminating the target with light from lamp LS. Bundle 79 preferably comprises a plurality of optic fibers which are suitably coated so that light is transmitted at high efficiency from one end of the bundle to the other.

A square optics plate 82 is secured to the lower surface of body 40 by the through bolts 50 and has a central aperture through which optics conduit 46 protrudes. A cup-shape optics housing 84 having a central opening 85 therethrough for the target illuminating optic fiber bundle 79 is disposed beneath optics plate 82. An optics block 87 which is generally T-shaped in cross section is disposed below optics housing 84, and cap screws 88 extend through clearance holes in optics block 87 and in optics housing 84 and in optics plate 82 and engage nuts (not shown) in optics plate 82 to support optics housing 84 and optics block 87 on body 40.

Optics block 87 has a central square opening 90 therethrough which receives the bundle of target illuminating optic fibers 79 that transmit light from lamp LS to illuminate the target. The termination pattern of the target illumination optic fibers 79 at the plane facing the target as shown in FIG. 4, and it will be noted that the target illuminating optic fibers 79 are intermeshed with and disposed on both sides of bundles of receiver optic fibers RFA, RFB, RFC and RFD which receiver light reflected from the target and transmit it to detector photocells. A protective glass lens 91 covers the ends of the optic fibers 79 which illuminates the target and the light receiving ends of the receiver optic fiber bundles, and a lens retainer 92 affixed by screws to optics housing 84 holds lens 91 in place.

A printed circuit board 94 is disposed within recess 42 in body 40 and has a central opening surrounding optics conduit 46. Printed circuit board 94 carries the four detector photocells PCA, PCB, PCC and PCD, and a light source control photocell LSC, but only one photocell, namely photocell LSC is shown in FIG. 1. The light paths through the optic fibers are shown schematically in FIG. 3. It will be noted that the optic fibers of bundle 79 which extend through optics conduit 46 illuminate the target, and individual bundles of receiver optic fibers RFA, RFB, RFC and RFD transmit light reflected from discrete areas of the target to the detector photocells PCA, PCB, PCC and PCD, respectively. Only a single bundle RFC of receiver optic fibers is illustrated in FIG. 1, but it will be noted that receiver fiber bundles RFA, RFB, RFC and RFD extend through opening 90 in optics block 87 and through optics housing 84 and transmit the reflected light to the individual detector photocells PCA, PCB, PCC and PCD. FIG. 4 illustrates the termination pattern of the receiver fiber bundles RFA, RFB, RFC and RFD at the plane facing the target. The reflected light receiving ends of the four receiver optic fiber bundles RFA, RFB, RFC and RFD are spaced apart in a direction perpendicular to the reference position centerline at the position detector field, and the reflected light receiving ends of receiver optic fiber bundles RFA, RFB, RFC and RFD are intermeshed with target illuminating optic fibers so that target illuminating optic fibers 79 are disposed on both sides of each receiver optic fiber bundle at the plane facing the target as seen in FIG. 4. Further, the ends of the receiver fiber bundles RFA and RFB which receive the light reflected from the target and transmit it to photocells PCA and PCB are disposed on opposite sides of the reference position centerline and outwardly from the ends of the receiver fiber bundles RFC and RFD which transmit light reflected from the target to photocells PCC and PCD. It will be appreciated that the optic fibers are shown greatly enlarged in the drawing and that the target illumination and receiver optic fiber bundles have a total cross section approximately one-quarter inch by five-sixteenths inch at the plane facing the target.

The receiver fiber bundles RFA, RFB, RFC and RFD terminate at their upper end within vertically extending apertures 101 (See FIG. 17) in optics plate 82 which register with vertically extending light transmitting apertures 102 (see FIGS. 1 and 2) in body 40 in which the detector photocells PCA, PCB, PCC and PCD and light source control photocell LSC on printed board 94 are mounted. Horizontally extending apertures 104 in body 40 register with the vertical light transmitting apertures 102 in body 40 through which the light from the receiver fiber bundles RFA, RFB, RFC and RFD is transmitted to the detector photocells PCA, PCB, PCC and PCD, and feedback light is transmitted to photocell LSC. Nylon inserts 105 within apertures 104 have female threads that engage light adjusting screws 106. The screws 106 can be turned manually to a position wherein they block a portion of the light transmitted from one of the receiver fiber bundles RFA through RFD to the corresponding detector photocell PCA, PCB, PCC or PCD.

Optics conduit 46 has a keyway slot 107 in which a bundle 109 of feedback optic fibers is disposed. A its upper end the feedback fiber bundle 109 receives light from condenser lens 45. Feedback bundle 109 extends through keyway slot 107 and is divided into five feedback fiber bundles FFA, FFB, FFC, FFD and FFE. The four feedback fiber bundles FAA, FFB, FFC and FFD terminate within feedback fiber receiving apertures 111 in optics plate 82 which register with the light transmitting apertures 102 in body 40 through which the light from the receiver bundles RFA, RFB, RFC and RFD is transmitted to the detector photocells PCA, PCB PCC and PCD. The feedback fiber bundle FFE also terminates within an aperture 111 in optics block 82 which registers with the light transmitting aperture 102 in body 40 in which the light source control photocell LSC is disposed. Horizontal apertures 113 in optics plate 82 register with vertical apertures 111, and internally threaded nylon inserts 114 within horizontal apertures 113 engage light adjusting screws 115 which may be manually turned to block a portion of the light from the feedback fibers FFA, FFB, FFC and FFD received by photocells PCA, PCB, PCC and PCD, respectively.

Condenser lens 45 and diffuser 53 provide uniform illumination across the target illuminating fiber bundle 79 and across the feedback fiber bundle 109 so that the position of the filament 59 of lamp LS is not critical. Inasmuch as lamp filament 59 is elongated in a direction parallel to the reference position centerline and is longer in this direction than the bundles of target illuminating and feedback optic fibers as schematically shown in FIG. 5, all of the target illuminating and feedback optic fibers receive substantially uniform illumination in this direction. However, the position of the filament 59 may vary from lamp to lamp in a direction transverse to the reference position centerline, and lamp adjusting screw 68 permits changing of the position of lamp filament 59 from side-to-side along this dimension so that the optic fibers at the extreme limit of the detector operational fields receives the same amount of light as the optic fibers of the center of the field. Thus turning of lamp adjusting screw 68 to move lamp filament 59 from side-to-side in a direction perpendicular to the reference position centerline permits adjustment of the amount of light received by detector photocell A relative to that received by detector photocell B, i.e., so that the portions of the target viewed by detector photocells A and B (which are further removed from the reference position) are illuminated equally by lamp LS.

SCHEMATIC CIRCUIT DIAGRAM

FIG. 10 is a functional diagram in block form of a preferred embodiment of the automatic adjusting photoelectric position detector of the invention which continuously monitors the position of a line or edge target within the position detection field (which is illustrated in FIG. 6 as the width of the view areas of the photocells PCC and PCD as seen through the receiver fiber bundles RFC and RFD, respectively). The preferred embodiment of the invention is described as having reflected light receiver fiber optics for determining the particular area of the field that each detector photocell monitors, but it will be appreciated that light from the detection field can also be transmitted to the detector photocells by other means such as apertures, collimation apparatus, lenses or focusing systems, or even by disposing the photocells in the proper position relative to the target. However, the optic fibers of the preferred embodiment provides an intense, uniform illumination of the sensing field and closely control the size, shape, and location of the light-receptive areas of the photocells and also facilitates adjustment of photocells response characteristics as described hereinafter.

FIGS. 7A, 7B, 7C and 7D show a target centered at the reference position within the position detection field when the target is respectively: (a) a low reflectivity (or transparant) line on a relatively light (high reflectivity) background, (b) a high reflectivity line on a relatively dark (or transparant background; (c) a right edge and (d) a left edge. The direction of target position deviation to be detected is shown in FIG. 6 and is perpendicular to the reference position ceterline illustrated in FIG. 4.

EDGE DETECTION MODE

When the target is an edge, a two-position multi-pole selector switch 115 is manually actuated to the upper, or EDGE position as shown in FIG. 10. When the target is a line, the switch 115 is manually actuated to the lower LINE position. The four detector photocells PCA, PCB, PCC and PCD are schematically shown in FIG. 10 as rectangles, designated A, B, and D respectively, and this symbol represents both the corresponding photocell and the light adjusting circuit therefor. The electrical adjusting circuit for each detector photocell PCA, PCB, PCC and PCD is the same and is shown in detail in FIG. 12 and discussed hereinafter. The outputs of the detector photocells PCA, PCB, PCC and PCD are respectively coupled to the non-inverting input of power amplifiers 1, 2, 3 and 4 of the operational amplifier type and whose voltage gains are equal. The outputs of power amplifiers 1 and 2 are coupled to the inputs of a two-input photocell signal summing network, or averaging network AB shown in block form which provides an output voltage that is the algebraic average of its two input voltages and the circuit of which is shown in FIG. 15. The averaging network AB provides the output volage $$E_0 = E_1 + E_2/2$$

where $E_1$ and $E_2$ are the input voltages. The output of averaging network is designated AB where AB = A+B/2 and A and B signify signals proportional to the output voltages from the photocells PCA and PCB, respectively.

Similarly, the outputs of power amplifiers 3 and 4 are coupled to the input of a photocell signal summing network CD shown in block form whose output voltage CD is the average C+D/2 of the two input voltages C and D from power amplifiers 3 and 4 which amplify the output signal from the photocells PCC and PCD, respectively.

The output AB of averaging network AB at point 22 is coupled through pole MS3 of selector switch MS to the inverting input of an output preamplifier 7 of the differential amplifier type and also to the non-inverting input of an output preamplifier 8 of the differential amplifier type. The output of the averaging network CD at point 23 is coupled through pole MS4 of selector switch MS to the non-inverting input of output preamplifier 7 and also to the inverting input of output preamplifier 8.

The power supply to preamplifier 7 is controlled by voltage actuated power supply switches PS1 and PS2, and the power supply to preamplifier 8 is controlled by similar voltage-actuated power supply switches PS3 and PS4. The circuit diagrams of the voltage actuated power supply switches PS1 through PS4 are shown in FIGS. 14A and 14B.

Preamplifiers 7 and 8 share common signal sources (AB at point 22 and CD at point 23) for their inputs, but the signal sources are fed to opposite inputs of preamplifiers 7 and 8 so their outputs will be numerically equal in voltage but opposite in polarity. When the power supply to preamplifiers 7 and 8 is cut off, these preamplifiers are in the non-conductive condition and becomes passive circuit elements of very high impedance which effectively isolate their output terminals from their input terminals. The output terminals of preamplifiers 7 and 8 are commoned at point 24 and connected: (1) to the input of an output power amplifier 9; and (2) to the junction of two fail-safe level adjusting resistances FR1 and FR2, one of which can be a potentiometer. The opposite ends of fail-safe resistances FR1 and FR2 are connected to the positive and negative terminals of the power supply, and it will be appreciated that te fail-safe resistances FR1 and FR2 ground the input 24 of output amplifier 9. Output power amplifier 9 amplifies the output of either preamplifier 7 or 8 depending upon which one is active and supplies the output signal of desired magnitude and polarity to suitable means (not shown) for returning the target to the reference position within the position detector field. Such target positioning means may neutralize at ground potential, but it will be appreciated that the failsafe signal can be ground potential or any positive or negative voltage selected.

The output of photocell PCA after being amplified in power amplifier 1 is coupled through pole MS 1 of selector switch MS to the inverting input of a contrast differential amplifier 5 and also to the non-inverting input of a contrast differential amplifier 6. The output of photocell PCB after being amplified by power amplifier 2 is coupled through pole MS2 of selector switch MS to the non-inverting input of differential contrast amplifier 5 and the inverting input of differential contrast amplifier 6. The input terminals of differential amplifiers 5 and 6 are thus connected to the common signal sources (signal A at point 11 and signal B at point 12) in reverse to each other so that the output of differential amplifier 5 is numerically equal to opposite in polarity to the output of differential amplifier 6.

The output of contrast differential amplifier 5 at point 13 is coupled to the input of power supply switches PS2 and PS3, and the output of differential amplifier 6 at point 14 is coupled to the input of power supply switches PS1 and PS4. Power supply switches PS1 through PS4 are voltage-actuated transistor-resistor logic (TRL) switches whose circuits are shown in FIGS. 14A and 14B and which control the availability of the power supply to output preamplifiers 7 and 8. Power supply switch PS1 only turns on to connect the positive power supply to preamplifier 7 when the output of differential amplifier 6 at point 14 reaches a predetermined negative potential, e.g., −3.0 volts, and similarly power supply switch PS2 only turns on to connect the negative power supply to preamplifier 7 when the output of differential amplifier 5 (at point 13) reaches a predetermined positive potential, e.g., −3.0 volts. Power supply switch PS 3 only turns on to connect the positive power supply to output preamplifier 8 when the output of differential amplifier 5 at point 13 reaches a predetermined negative potential, and similarly power supply switch PS4 only turns on to connect the negative power supply to output preamplifier 8 when the output of differential amplifier 6 (at point 14) attains a predetermined positive potential, e.g., +3.0 volts. Consequently, if the outputs of differential amplifiers 5 and 6 are +3.0 and −3.0 volts respectively, power supply switches PS1 and PS2 will both be on and preamplifier 7 will be active. Similarly, if the outputs of differential amplifiers 5 and 6 are −3.0 and +3.0 volts respectively, power supply switches PS3 and PS4 will be turned on and preamplifier 8 will be active. Inasmuch as the outputs of contrast differential amplifiers 5 and 6 are always opposite in polarity, only the pair of switches PS1 and PS2 or the pair of switches PS3 and PS4 can be on at a given time, and consequently only output preamplifier 7 or preamplifier 8 can be active at any one time.

Target positions to the right of the reference position centerline always produce a negative output relative to neutral (ground) from output power amplifier 9 at point 25, whereas target positions to the left of the reference position centerline always produce a positive output relative to ground from power output amplifier 9 at point 25, and this is true regardless of whether the target is a line or a right edge or a left edge and irrespective of the orientation of the low reflectivity and high reflectivity portions of the target. Stated in another way, the output sense remains the same regardless of whether the target is a left edge or a right edge or a line and irrespective of the polarity of contrast of the target.

When selector switch MS is in the EDGE position (edge detection mode), the contrast (target) polarity is determined by comparing signals A and B from photocells PCA and PCB. If the target is a right edge as illustrated in FIGS. 7C (edge centered), 8C (edge to left of center), and 9C (edge to right of center), photocell PCA receives less light than photocell PCB A<B; the output of differential amplifier 5 is positive; the output of differential amplifier 6 is negative; power switches PS1 and PS2 are on so preamplifier 7 is active; and power switches PS3 and PS4 are off so preamplifier 8 is off. The magnitude of the detector output signal from amplifier 9 at point 25 is determined by the numerical difference of signals AB and CD, and the polarity of such position detector output signal from amplifier 9 is determined by the relative polarity of signals AB and CD and which of the preamplifiers 7 or 8 is active. It will be appreciated that a signal such as AB becomes more positive with increasing light to the corresponding photocells. Still assuming that the target is a right edge, preamplifier 7 will be active but the output of amplifier 9 will be zero when the edge is centered as illustrated in FIG. 7C so that AB equals CD. Preamplifier 7 will be active but the output of amplifier 9 will be positive when the right edge target is left of the reference position as shown in FIG. 8C so that AB<CD and the more positive signal CD is applied to the non-inverting input of preamplifier 7. The polarity of the position detector output signal from amplifier 9 is neative when the right edge target deviates to the right of thereference position as shown in FIG. 9C so that AB>CD and the more positive signal is applied to the inverting input of preamplifier 7. The magnitude of the target position detector output signal from output amplifier 9 at point 25 is dependent upon the numerical difference of signals AB and CD.

Recalling that in the edge detection mode the contrast (target) polarity is determined by comparing signals A and B from photocells PCA and PCB, if the target is a left edge as shown in FIGS. 7D (edge centered), 8D (edge to left of center) and 9D (edge to right of center), photocell PCA recevies more light than photocell PCB; A>B; the output of contrast different amplifier 6 is positive and that of contrast differential amplifier 5 is negative; power switches PS1 and PS2 are off so preamplifier 7 is off, and power switches PS3 and PS4 are on so preamplifier 8 is active. The polarity of the position detector output signal at point 25 is determined by the relative polarity of signals AB and CD. With the left edge target centered as shown in FIG. 7D, AB equals CD and the output from active preamplifier 8 is zero. With the left edge target to the left of the reference position centerline as shown in FIG. 8D, AB>CD and the output of amplifier 9 is positive because the more positive signal AB is coupled to the non-inverting input of active preamplifier 8. With the left edge target to the right of the reference position centerline as shown in FIG. 9D, AB< CD and the output of amplifier 9 is negative because the more positive signal CD is coupled to the inverting input of active output preamplifier 8.

As described hereinbefore, the power switches PS1 through PS4 do not turn on until the contrast is sufficiently great so that the outputs of contrast differential amplifiers 5 and 6 of the required polarity reach a predetermined magnitude. In other words if the target contrast is too small for the detector to operate satisfactory, the contrast polarity switches PS1 through PS4 will remain off and the output of amplifier 9 will remain at a predetermined "fail-safe" value. Thus, when no valid target is in the position detection field, the output signal from output amplifier 9 does not change. The position detection apparatus thus reverts to a fail-safe output which may represent neutral or inaction by the means (not shown) for positioning the target laterally.

Figure 20:
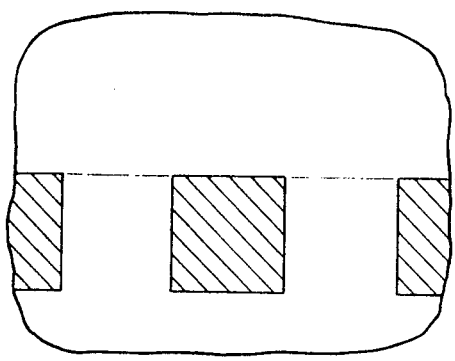
FIGS. 19 and 20 illustrate typical checkerboard and intermittent targets respectively.
Figure 19:
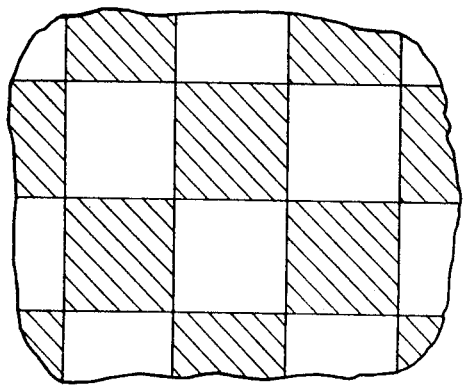

Prior art position detectors cannot monitor intermittent patterns such as shown in FIG. 20 and tend to move the target laterally when an intermittent spacing occurs in the target. Such prior art position sensing devices require mechanical switching means to inactivate the apparatus when no target is present in order to prevent false outputs and erroneous lateral movement of the target. Prior art position detection apparatus requires manually operated means to switch the polarity of the output signal in order to change from monitoring a right edge to monitoring a left edge, and consequently such prior art position detection apparatus cannot monitor the edges formed by the squares of a checkerboard pattern, such as illustrated in FIG. 19. The position detector disclosed herein automatically changes the contrast polarity at the outputs of differential amplifiers 5 and 6 when changing between monitoring a left edge and a right edge target and thus is capable of automatically monitoring a checkerboard pattern such as illustrated in FIG. 19 without the manual switching means required by prior art apparatus.

LINE POSITION DETECTION

Selector switch MS is manually actuated to the lower, or LINE position when the target is a line. In the LINE position of selector switch MS, the output of averaging network CD is coupled through pole MS1 to the inverting input of contrast differential amplifier 5 and also to the non-inverting input of contrast differential amplifier 6. Similarly, the output of averaging network AB is coupled through pole MS2 to the non-inverting input of differential amplifier 5 and to the inverting input of differential amplifier 6. The output of photocell PCC after being amplified by power amplifier 3 is coupled through pole MS3 to the inverting input of preamplifier 7 and to the non-inverting input of preamplifier 8. The output of photocell PCD after being amplified in power amplifier 4 is coupled through pole MS4 to the non-inverting input of preamplifier 7 and to the inverting input of preamplifier 8.

In the line position detection mode, contrast (target) polarity is determined by comparing signals AB and CD, and the magnitude of the position detection output signal from the amplifier 9 at point 25 is determined by the numerical difference of the output signals from photocells PCC and PCD, as amplified by preamplifier 7 or 8, whichever is active. The polarity of the target position signal at the output of amplifier 9 is determined by the relative polarity of the signals from photocells PCC and PCD and which of the output preamplifiers 7 or 8 is active.

Assume the target is a low reflectivity line against a relatively high reflectivity background as shown in FIGS. 7A (line centered), 8A (target to left of center) and 9A (target to right of center). With this condition; AB>CD; the input AB to the non-inverting input to contrast differential amplifier 5 is greater than the signal CD to its inverting input so the output thereof is positive; the output of contrast differential amplifier 6 is negative; contrast position switches PS1 and PS2 are on so that preamplifier 7 is active; and contrast position switches PS3 and PS4 are off so that preamplifier 8 is off. When the line target is centered as shown in FIG. 7A, the outputs from photocells PCC and PCD are equal, and the target position signal amplified by active preamplifier 7 appearing at the output of amplifier 9 is zero. When the low reflectively line target is to the left of the reference position centerline as shown in FIG. 8A, the output signal from cell PCC is less than the output signal from cell PCD; the magnitude of the position detector output signal appearing at the output of amplifier 9 is determined by the numerical difference of signals C and D; and the output from amplifier 9 at point 25 is positive since the signal D applied to the non-inverting input of active preamplifier 7 is greater than the signal C to its inverting input. When the low reflectivity line target is to the right of the reference position centerline as shown in FIG. 9A, the signal from photocell PCC> the output signal from photocell PCD; the position detector output signal appearing at the output from amplifier 9 at point 25 is determined by the difference of signals C and D and the polarity of this signal is negative since the input signal C to the inverting input of active preamplifier 7 is greater than the input signal D to the non-inverting input thereof.

If the target is a high reflectivity line against a relatively low reflectivity background as shown in FIGS. 7B, 8B and 9B, the light received by photocells PCC and PCD is greater than the light received by photocells PCA and PCB; signal AB< signal CD; the output of contrast differential amplifier 5 is negative since the signal CD to its inverting input is greater than the signal AB applied to its non-inverting input; the output of contrast differential amplifier 6 is positive; power supply switches PS1 and PS2 are off so that preamplifier 7 is off; and power supply switches PS3 and PS4 are on so that preamplifier 8 is active. If the line target is centered in the position detection field as shown in FIG. 7B, equal amounts of light are received by photocells PCC and PCD and the output of active preamplifier 8 and output amplifier 9 is zero. If the high reflectivity line target is to the left of the reference position centerline as shown in FIG. 8B, the output signal from photocell PCC> the output signal from photocell PCD so that the polarity of the output from active preamplifier 8 and the position detector output signal appearing at the output of amplifier 9 is positive. If the high reflectivity line target is to the right of the reference position centerline as shown in FIG. 9B, photocell PCD receives more light than photocell PCC; signal C< signal D, and the polarity of the position detector output signal appearing at the output of amplifier 9 is negative.

The logic table of FIG. 11 summarizes all of the possible target conditions illustrated in FIGS. 7, 8 and 9 and illustrates that the output "sense" remains the same irrespective of whether the target is a line or a left edge or a right edge and also irrespective of the polarity of contrast of such target. Stated in another manner, target positions to the right of the reference position centerline always produce a negative output with respect to ground from output amplifier 9 at point 25, and target positions to the left of the reference position centerline always produce a positive output with respect to ground from amplifier 9 at point 25.

AUTOMATIC GAIN CONTROL

Targets of different contrast ratios (i.e., ratio of the lowest light reflectivity portion of the target to the portion of highest reflectivity) monitored by known position detection devices produce responses of different magnitudes from the detector photocells for a given deviation of the target from the reference position. Such differences in photocell response are independent of lateral deviations of the target and therefore result in different detector outputs unless means are provided to adjust the gain of the position detector. Many known position detection devices require manual adjustment of gain to compensate for targets having different contrast ratios.

The position detector of the invention connects the sensing photocells PCA, PCB, PCC and PCD in a closed loop amplifier control system which continuously and automatically adjusts the gain of the position detector to a constant value regardless of variations in contrast ratio of the target. This is accomplished by an automatic gain control amplifier AGC shown in block form in FIG. 10 which provides a controlled power supply to the light adjusting circuits for the detector photocells PCA, PCB, PCC and PCD. The automatic gain control amplifier AGC in effect decreases the voltage to all four detector photocells PCA, PCB, PCC and PCD when an increase in target contrast occurs thereby providing a constant target position-to-output relationship.

In the edge detection mode, the difference in the responses of the photocells PCA and PCB which view areas of the target further removed from the reference position centerline is utilized as an indication of contrast in the target. The contrast logic signals from photocells PCA and PCB as amplified by power amplifiers 1 and 2, are inputs of the contrast differential amplifiers 5 and 6. The outputs of differential amplifiers 5 and 6 appearing at points 13 and 14 (which outputs are equal in magnitude but opposite in polarity) are coupled through similarly poled steering diodes D1 and D2 to the input of the automatic gain amplifier AGC. The output of that differential amplifier 5 or 6 which is positive in polarity is coupled through the corresponding steering diode D1 or D2 to the input at point 15 of automatic gain control amplifier AGC whose circuit is shown in FIG. 13.

AUTOMATIC GAIN CONTROL AMPLIFIER AGC

The output of contrast differential amplifier 5 or 7 which is positive in polarity is coupled through the corresponding steering diodes D1 or D2 to point 15 and through an input resistor R1 to the base of a high gain amplifier NPN transistors Q1. The series arrangement of a capacitor C1 and a resistance R2 is connected in shunt to resistance R1 and forms a phase lead network which increases the gain of the Q1 stage when the contrast input of point 15 is rapidly changing, thereby providing improved high frequency response. The collector of transistor Q1 is coupled through a resistance R5 to the positive terminal of a DC power supply, and the emitter of transistor Q1 is connected through a resistance R4 to the emitter of a PNP transistor Q2 whose collector is coupled to the negative terminal of the power supply. A resistor R3 connects the base of transistor Q1 to the emitter of transistor Q2. The resistances R1, R3, R4, and R5 determine the DC gain of the Q1 amplifier stage. The resistances R1 and R3 are selected so that transistor Q1 begins to conduct when an input signal of approximately +4.0 volts appears at point 15. The base of transistor Q2 is coupled to the junction of two resistances R7 and R6 forming a voltage divider between the negative terminal of the power supply and ground. Transistor Q2 and resistances R6 and R7 form a bias amplifier for the Q1 stage to assure that the collector of transistor Q1 can attain ground potential when transistor Q1 is saturated. It will be appreciated that increases in the contrast input signal to amplifier AGC at point 15 will increase the emitter current through transistor Q1 and the voltage drop across collector resistor R5 and thus lower the voltage at the collector of transistor Q1 and the positive and negative output voltages at points 16 and 17 respectively from amplifier AGC.

The collector of transistor Q1 is connected to the base of a PNP transistor Q3 having its emitter connected through a resistance R9 to the positive terminal of the power supply and its collector coupled through a resistance R8 to the negative power supply terminal. Resistance R8 is equal to resistance R9, and the gain of the Q3 stage is preferably equal to one. The emitter and collector of transistor Q3 are equal in voltage and of opposite polarity. The emitter of transistor Q3 is coupled through an emitter follower (current amplifier) transistor Q4 to the positive output terminal of amplifier AGC at point 16, and the collector of transistor Q3 is coupled through an emitter follower (current amplifier) transistor Q5 to the negative output terminal of the AGC amplifier at point 17.

Figure 22:
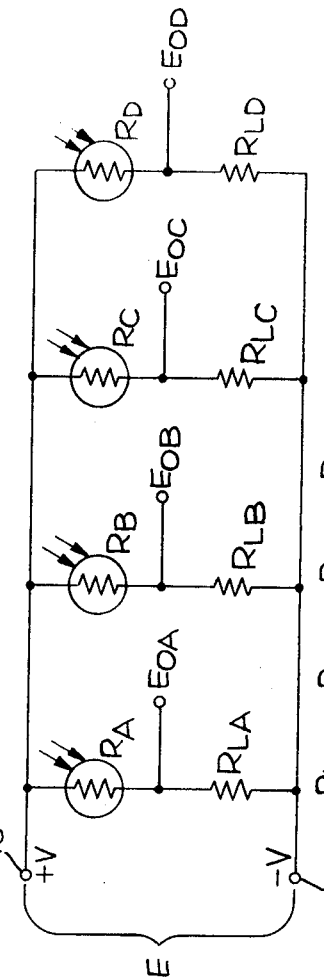
FIGS. 21 and 22 schematically represent electrical network for an individual photocell and the network for all four detector photocells respectively.

The positive and negative voltages with respect to ground from amplifier AGC appearing at points 16 and 17 are impressed across the individual networks A, B, C and D for the detector photocells PCA, PCB, PCC and PCD shown in block form in FIG. 10 and in detail in FIGS. 12 and 22 each of which comprises the serial arrangement of a photocell (such as PCA), a load resistance R14 and a trimming potentiometer R13. Resistances R14 are chosen to match the resistance of the corresponding photocells at a predetermined level of illumination as described hereinafter. The output of each photocell network A, B, C and D appearing at the junction of the photocell and its load resistance R14 is applied to the input of the corresponding power amplifier 1, 2, 3 or 4.

As the positive input of amplifier AGC increases to a predetermined level as a result of increase of contrast of the target, transistor Q1 of the AGC amplifier is turned on, and amplifier AGC begins to decrease the magnitude of its positive and negative outputs at terminals 16 and 17 which are the inputs to the photocell network A, B, C and D for the photocells PCA, PCB, PCC and PCD respectively. The outputs of the photocell networks A, B, C, and D decrease in direct proportion to the decrease of the AGC amplifier outputs at points 16 and 17, and therefore the inputs at points 11 and 12 to the contrast differential amplifiers 5 and 6 also decrease until equilibrium is reached between the AGC amplifier outputs at points 16 and 17 and the inputs to the contrast differential amplifiers at points 11 and 12.

Since the gain of amplifier AGC is very high, only slight input signal change at point 15 is required to realize the full output range of amplifier AGC. Once the threshold of activation of amplifier AGC is attained by turning on transistor Q1, the contrast signals at points 11 and 12 are held virtually constant in magnitude. Inasmuch as the networks A, B, C and D for all four photocells PCA, PCB, PCC and PCD have the same voltage source from terminals 16 and 17 of amplifier AGC, the response of all four photocells are attenuated equally, including those photocell signals resulting from change of target position.

The output amplitude capability of the photocells PCA, PCB, PCC and PCD is in direct proportion to the magnitude of the voltage supplied to them by amplifier AGC. Consequently, as the voltage supply to the photocell networks is varied, the output signals from the photocell networks will be proportionally changed. The higher the contrast of the target, the lower the supply voltages to the photocell adjusting networks becomes. Since contrast differential amplifier 5 or 6 in series with amplifier AGC has an extremely high loop gain, the output signals from the detector photocells PCA, PCB, PCC and PCD approach a constant magnitude for a given target position regardless of target contrast. Further, since the target contrast relates directly to the response of the detector photocells, controlling the contrast signal magnitude to a constant value correspondly controls the gain of the position detector to a constant value.

PHOTOCELL MATCHING ADJUSTMENT

Photocells PCA, PCB, PCC, PCD and LSC are preferably of the bulkeffect photoconductive type, although the arrangement of the light reception areas with respect to a target described hereinbefore is also operable with other types of photocells such as those of the photoemissive, photovoltaic, or the junction photo conductive type.

Figure 21:
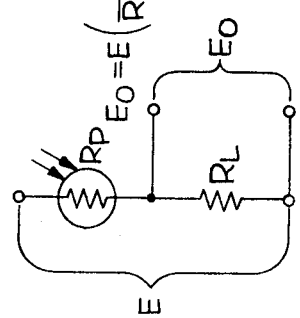

The photocell circuits shown in FIGS. 12, 21 and 22, together with the optical circuits schematically shown in FIG. 3 interconnecting the light source LS, the target and the detector photocells and the light source brilliance control shown in FIG. 16 together form a photocell matching system which makes use of both light and electrical components to cause the four detector photocells PCA, PCB, PCC and PCD to respond in an identical manner to identical illumination from the target. The biasing of the photocells through light feedback fibers FFA through FFD accomplishes a response adjustment which is not possible by adjustment of electrical parameters only.

As described hereinbefore, the amount of light transmitted from light source LS to photocells PCA, PCB, PCC, PCD and LSC through the light feedback fibers FFA FFB, FFC, FFD and FFE, respectively may be individually adjusted by the light adjusting screws 115 and 106 (see FIG. 3) which may be manually turned to a position wherein each obstructs a desired portion of the light transmitted from the corresponding feedback fiber bundle FFA through FFE to the associated photocells PCA, PCB, PCC, PCD and LSC.

The response of bulk-type photoconductive cells to a given level of illumination varies materially from cell to cell. The electrical resistance of such a photoconductive cell of a given active material exposed to a predetermined illumination level depends upon the physical structure of the active area, i.e., length and thickness of photoconductive material and the area exposed to light. Further, even assuming that bulk-type photoconductive cells of equal active areas could be selected, variations in transmissibility of protective coatings and windows from cell to cell make it virtually impossible to manufacture photocells that are identical in response to a given level of illumination. However, bulk-type photoconductive cells will exhibit response characteristics in precise proportion to each other when the effective illumination on their active areas is the same. Consequently, calibration of the detector photocells PCA, PCB, PCC and PCD so that their outputs are matched under identical conditions of target reflectivity requires adjustment of the effective illumination that each photocell receives under identical target conditions.

The resistances $R_A$, $R_B$, $R_C$, and $R_D$ of the detector photocells PCA, PCB, PCC and PCD respectively may be different, but the photocells are connected in an electrical circuit schematically shown in FIG. 22 which (assuming the effective illumination of all four photocells is equal) will provide equal electrical output signals $E_{OA}$, $E_{OB}$, $E_{OC}$ and $E_{OD}$ since the response of each photocell will be in fact proportional to that of all the others. FIG. 21 schematically represents the electrical circuit for an individual detector photocell and is similar to FIG. 12 except that the photocell is represented by its resistance designated $R_P$ and is shown connected in series with a single load resistor $R_L$ which is equal to the sum of the trimming and load resistances R13 and R14 shown in FIG. 12.

Prior to mounting the detector photocells PCA, PCB, PCC and PCD in the scanning head, load resistors $R_{LA}$, $R_{LB}$, $R_{LC}$, and $R_{LD}$ are selected for the individual photocells PCA, PCB, PCC and PCD in a calibrator so that each load resistor precisely matches the resistance of the corresponding photocell. The calibrator may vary illumination over a controlled range and indicate response of the cell for different load resistances so that the load resistance $R_L$ for the cell under test may be selected by comparison with a master photocell and its particular load resistor.

In the electrical circuit shown in FIG. 22, the resistance of each cell (such as $R_A$) and its load resistance (such as $R_{LA}$) form a voltage divider across which is impressed the voltage E appearing at the output terminal 16 and 17 of the automatic gain control amplifier AGC. (The potential E equals the sum of the positive voltage +V with respect to ground appearing at terminal 16 and the negative voltage −V appearing at terminal 17). The electrical output signal (such as $E_{OA}$) appears at the junction of each photocell (such as $R_A$) with its load resistor (such as $R_{LA}$). In accordance with the laws of proportionality, all photocells so mated with load resistances and exposed to identical effective illumination will be in the relation $$R_{LA}/R_A = R_{LB}/R_B = R_{LC}/R_C = R_{LD}/R_D$$

so their voltage outputs will precisely match $$E_{OA} = E_{OB} = E_{OC} = E_{OD}$$

In a fiber optic system wherein the light transmitting and light receiving optic fibers are in close proximity to each other and reflecting surfaces such as glass lens 91 are common to both the light illumination and receiving optic fibers, constant internal ambient illumination is transmitted to each detector photocell but the amount of such internal ambient illumination varies from cell to cell. Further, the effective transmitting area of the illumination fibers and optic fibers associated with each detector photocell may be different from that for the other cells due to manufacturing tolerances. Consequently, the amount of light received by each detector photocell may be considerably different from that received by the others even though the target is identical for all detector photocells.

Figure 23:
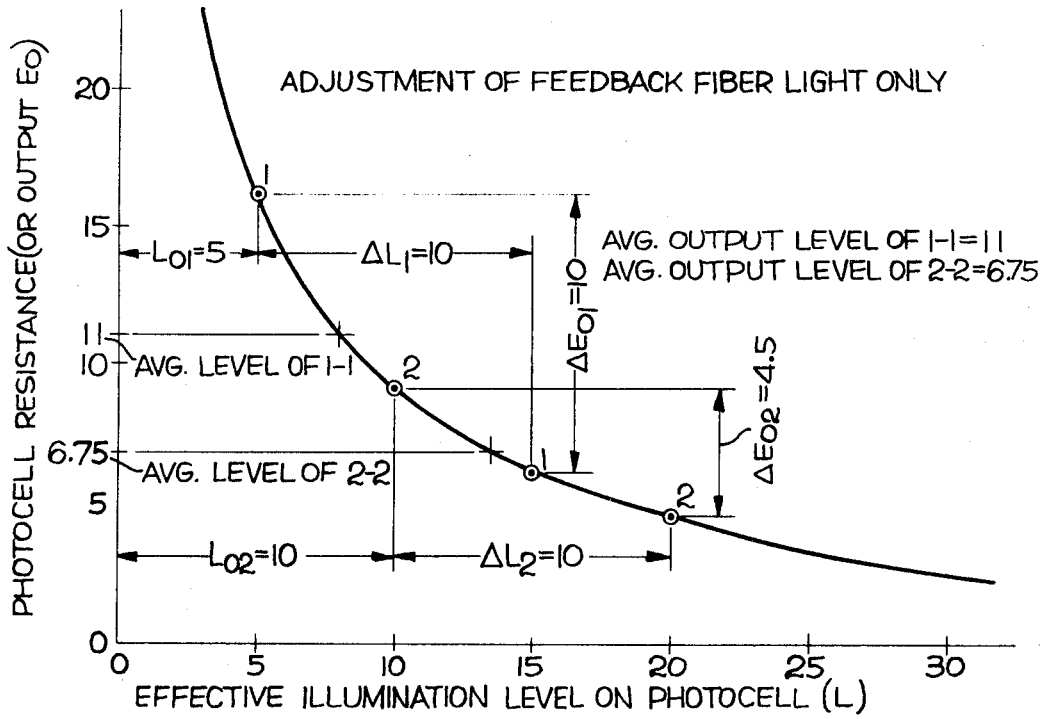
FIGS. 23 and 24 illustrate adjustment of the detector photocells by optical means so that each is exposed to the same effective illumination level.
Figure 24:
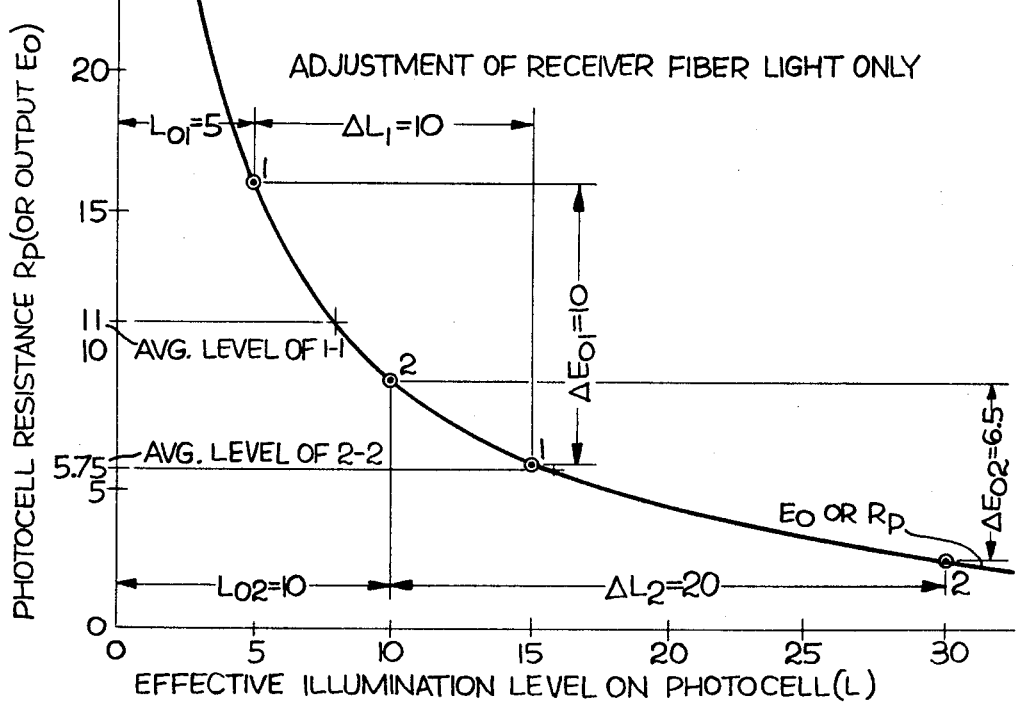

The light adjusting screws 106 which regulate the amount of light that the detector photocells PCA − PCD receive from the receiver optic fibers RFA − RFD and the light adjusting screws 115 that regulate the amount of light which the detector photocells PCA-PCD receive from the feedback optic fibers FFA-FFD comprise means for exposing each detector photocell PCA-PCD to the same effective illumination level. The light adjusting screws 106 for the receiver optic fibers RFA-RFD control the range ($\Delta E_O$) or amplitude of the output signals $E_{OA}$ - $E_{OD}$ as illustrated in FIG. 24, where the adjustment screws 115 for the feedback optic fibers FFA-FFD control the average level of the output signals $E_{OA}$ - $E_{OD}$ as illustrated in FIG. 23. Actually the two adjustments interact since raising the light level received by the detector photocells PCA-PCD with the feedback optic fiber adjustment screws 115 inherently reduces the range (change $\Delta E_O$ of output signal or change $\Delta R_P$ of cell resistance for a given change of illumination level $\Delta L$) since the cell now operates in a lower $\Delta R_P$ area of the response curve as seen in FIG. 23. Also, increasing the amount of light received by the photocells by opening the receiver optic fiber adjustment screws 106 inherently lowers the average level of the output signals $E_{OA}$ - $E_{OD}$.

FIG. 23 illustrates the effect of turning only the feedback fiber light adjusting screws 115 to increase the amount of feedback light received by the detector photocells PCA-PCD while the amount of reflected light is kept constant. The initial effective illumination level of the detector photocells is designated $L_{01}$, the portion of the curve between points 1—1 plots photocell resistance $R_P$ (or electrical output signal $E_O$) against effective illumination level in the range $L_{01} = 5$ to $L_{01}+(\Delta L_1 = 10)$, and it will be noted that the change in output signal $\Delta E_{01}$ for a given change in effective illumination level $\Delta L_1 = 10$ is equal to 10 and further that the average output level signal $E_O$ for the portion of the curve 1—1 has the magnitude of 11. The portion of the curve between points 2—2 plots photocell resistance $R_P$ (or output signal $E_O$) versus effective illumination level when the feedback fiber light adjusting screws 115 are opened to increase the initial illumination to $L_{02} = 10$. The portion 2—2 of the curve covers the range of effective illumination levels from $L_{02} = 10$ to $L_{02}+ (\Delta L_0 = 10)$, and it will be noted that the range, or change in output signal $\Delta E_{02}$ for the portion of the curve 2—2 equals only 4.5 and that the average output level for the portion 2—2 of the curve has the value 6.75. The complete curve shown in FIG. 23 is the resultant $E_0$ (or $R_P$) versus effective cell illumination L for all detector photocells PCA-PCD after the proper load resistance $R_{LA}$ - $R_{LD}$ has been chosen for each cell. Since the response of each detector photocell PCA-PCD with its matched load resistance $R_{LA}$ - $R_{LD}$ must be on the resultant curve shown in FIG. 23, it will be appreciated that the two adjustments (i.e., feedback fiber light adjustment by screws 115 and receiver fiber light adjustment by screws 116) can cause all detector photocells to have identical responses to identical levels of target reflectivity.

FIG. 24 illustrates the effect of turning the receiver fiber adjusting screws 115 only to increase the amount of reflected light from the target transmitted to the detector photocells while the amount of feedback light is held constant. The portion 1—1 of the curve shows the variation in photocell resistance $R_P$ (or output signal $E_O$) for an initial setting $L_{01} = 5$ of the receiver fiber adjusting screws 115 over the range $L_{01} = 5$ to $L_{01}+(\Delta L_1=10)$. The change $\Delta E_{01}$ in output signal over the illumination range $\Delta L_1 = 10$ is equal to 10, and the average output signal level for the portion of the curve 1—1 has the value of 11. The portion 2—2 of the curve shows the photocell response when the receiver fiber adjusting screws 115 are opened to double the amount of light received through the receiver fibers to $L_{02} = 10$ over the target illumination range $L_{02}$ to $L_{02}+(\Delta L_2 = 20)$. It will be noted that the range, or change of output signal $\Delta E_{02}$ equals only 6.5 even through the change in illumination level $\Delta L_2$ is also doubled, and further that the average output level is only 5.75 for the portion 2—2 of the curve. It will be appreciated that when the receiver fiber optic screw adjustment is changed, the initial illumination level also changes and has the same effect as the feedback fiber light adjustment except that $\Delta L$ is also changed, whereas in contrast, adjustment of the amount of feedback fiber light only has no effect on $\Delta L$ since this is dependent solely upon changes in target reflectivity.

Consequently, in order to increase the range $\Delta E_0$ of output signal without changing the average level of output signal, the receiver fiber adjusting screws 106 are opened and the feedback fiber adjusting screws 115 are closed (i.e., turned to reduce the amount of feedback light received by the detector photocells).

LIGHT SOURCE BRILLIANCE CONTROL

The light source brilliance control shown in FIG. 16 automatically maintains the light source lamp LS at a constant light output regardless of aging effects and variation in ambient temperature, thereby keeping the detector photocells PCA, PCB, PCC and PCD in a desired range of illumination levels and permitting the photocell response characteristics to remain in precise adjustment at all times. The lamp LS is connected in series with the emitter-collector circuit of a power series transistor Q12 across the terminals of a heavy duty DC power supply. Photocell LSC receives light from lamp LS through feedback fiber bundle FFE as shown in FIG. 3. The inverting input of an operational amplifier 30 of the light source brilliance control is connected through an input resistance R24 to a voltage divider formed by two resistances R22 and R23 connected in series between the positive terminal of a power supply and ground. The voltage divider formed by resistances R22 and R23 establishes the input bias for operational amplifier 30. Photocell LSC is connected in series with a resistance R21 between the positive terminal of the power supply and ground and forms a voltage divider for active input to amplifier 30, and the voltage at the junction of photocell LSC and resistance R21 is coupled through an input resistance R25 to the non-inverting input of amplifier 30. The output of operation amplifier 30 is coupled through a voltage regulating Zener diode Z11 to the base of a transistor Q11 which is connected in a Darlington circuit with the power transistor Q12. Zener diode Z11 in series with a resistor R27 connected between the base and the collector of transistor Q11 provides a load for amplifier 30, and the voltage drop across resistor R27 biases transistor Q11 on. A feedback resistance R26 for amplifier 30 is connected between the emitter of transistor Q11 and the inverting input of amplifier 30 and establishes the gain of amplifier 30 as 1+R26/R24. A capacitor C11 connected between the base of transistor Q11 and the inverting input of amplifier 30 provides degenerative feedback and keeps the light source brilliance control stabilized.

TEMPERATURE CONTROL

Body 40 is preferably constructed of aluminum, and an automatic temperature control preferably maintains body 40 at a temperature above any ambient temperature to which the position detecting head may be adjusted in operation to maintain a constant ambient temperature for the detector photocells PCA, PCB, PCC, PCD and LSC.

Figure 18:
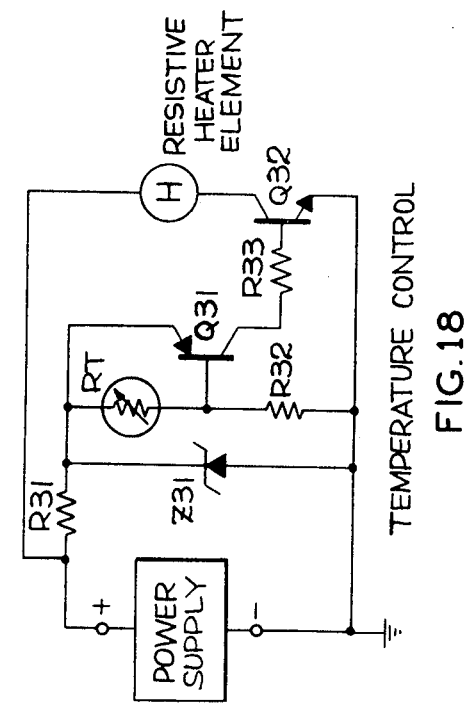
FIG. 18 is a schematic circuit diagram of the temperature control for the scanning head shown in FIGS. 1 and 2.

The circuit diagram for the temperature control is shown in FIG. 18. A resistance R31 connected in series with a Zener diode Z31 across the positive and negative terminals of a power supply form a regulated voltage supply. A thermistor RT mounted within recess 42 (not shown in FIGS. 1 and 2, so as to be in thermal heat exchange relation with body 40) is electrically connected in series with a resistor R32 across the Zener diode Z31. A PNP transistor Q31 has its emitter and base connected to opposite sides of thermistor RT and its collector coupled through a current limiting resistance R33 to the base of a power transistor switch Q32. The emitter of power transistor switch Q32 is connected to the grounded negative terminal of the power supply and its collector is connected to the positive terminal of the power supply through a resistive heater element H (not shown in FIGS. 1 and 2) which is mounted within recess 42 to be in thermal heat exchange relation with body 40. Body 40 thermally connects the heater element H to the thermistor RT and to the photocells PCA, PCB, PCC, PCD and LSC. Heater adds heat to body 40 so that it is maintained at a substantially constant temperature above any ambient temperature that the position detection head may encounter in operation and any changes in temperatures of body 40 are detected by thermistor RT. The resulting change in resistance of thermistor RT varies the potential across the base-emitter junction of transistor Q31, and the consequent change in collector potential of transistor Q31 is coupled to the base of power transistor switch Q32 and varies the current through resistive heater H in a direction to maintain body 40 at a substantially constant temperature.

I claim:

1. In an optical detecting system, the combination of
a source of illumination for a target to be detected,
a plurality of detector photocells,
a plurality of receiver optic fiber means each of which communicates with one of said detector photocells and has a reflected light receiving end disposed to receive light reflected from said target, said reflected light receiving ends of said plurality of receiver optic fiber means receiving light from different portions of said target, and
adjustable means disposed between certain of said receiver optic fiber means and the corresponding detector photocell for selectively blocking a portion of the light transmitted from said receiver optic fiber means to said photocell.

2. In an optical detecting system in accordance with claim 1 and including a target illuminating optic fiber bundle for transmitting light from said source to said target and wherein said light receiving ends of said receiver optic fiber means are intermeshed with optic fibers of said target illuminating bundle.

3. In an optical detecting system in accordance with claim 1 and including a plurality of feedback optic fiber means each of which communicates with one of said detector photocells for transmitting light from said illumination source to the corresponding detector photocell.

4. In an optical detecting system in accordance with claim 3 and including adjustable means disposed between certain of said feedback optic fiber means and the corresponding detector photocell for selectively blocking a portion of the light transmitted from said feedback fiber optic means to said photocell, whereby the ambient illumination of said plurality of detector photocells may be made substantially equal.

5. In an optical detecting system in accordance with claim 4 and including a voltage source for said plurality of detector photocells, and wherein each of said detector photocells is connected in series with a resistor across said voltage source, the resistance of each said resistor being substantially equal to that of the corresponding photocell at a predetermined level of illumination.

6. In an optical scanning system in accordance with claim 1 and including
a voltage supply for said source of illumination,
a light source control photocell,
feedback optic fiber means communicating with said light source control photocell for transmitting light thereto from said source of illumination, and
means responsive to the output from said light source control photocell for maintaining the potential of said voltage supply substantially constant.

7. In an optical detecting system in accordance with claim 1 wherein each of said detector photocells is connected in series with a load resistor having a resistance approximately equal to that of said photocell at a predetermined level of illumination, and including a voltage source for said detector photocells, and wherein the serial arrangement of each detector photocell and its load resistor is connected across said voltage source.

8. In an optical detecting system in accordance with claim 5 and including means responsive to the outputs of at least two of said detector photocells for deriving a contrast signal whose magnitude is a function of the relative intensity of light received from different areas of said target, and
automatic gain control means receiving said control signal as an input for providing said voltage source for said plurality of detector photocells, the gain of said automatic gain control means being inversely proportional to the magnitude of input signal thereto.

9. In an optical scanning system, the combination of:
a source of illumination for a target to be scanned,
a plurality of detector photocells,
means for transmitting to individual ones of said detector photocells light from discrete areas of said target,
a plurality of feedback optic fiber means each of which communicates with one of said detector photocells for transmitting light thereto from said source of illumination, and
a plurality of adjustable means each of which is disposed between one of said feedback optic fiber means and the corresponding detector photocell for selectively blocking a portion of the light transmitted from said feedback optic fiber means to said detector photocell, whereby the ambient illumination of said plurality of detector photocells may be made equal.

10. In an optical scanning system in accordance with claim 9 wherein said means for transmitting light from discrete areas of said target to said detector photocells includes a plurality of receiver optic fiber means each of which communicates with one of said detector photocells and has a reflected light receiving end disposed contiguous said target.

11. In an optical scanning system in accordance with claim 10 and including a target illuminating optic fiber bundle for transmitting light from said source of illumination to said target and wherein said light receiving ends of said receiver optic fiber means are interleaved with optic fibers of said target illuminating bundle.

12. In an optical scanning system in accordance with claim 11 wherein said target is transported longitudinally and said reflected light receiving ends of said receiver optic fiber means are spaced apart in a direction laterally of the direction in which said target is transported and wherein optic fibers of said target illuminating bundle are disposed on opposite sides of each of said reflected light receiving ends along said lateral direction.

13. In an optical scanning system in accordance with claim 9 and including
a voltage supply for said source of illumination,
a light source control photocell,
feedback optic fiber means communicating with said light source control photocell for transmitting light thereto from said source of illumination, and
means responsive to the output from said light source control photocell for maintaining the potential of said voltage supply substantially constant.

14. In an optical scanning system in accordance with claim 11 and including a plurality of adjustable means each of which is disposed between one of said receiver optic fiber means and the corresponding detector photocell for selectively varying the amount of light transmitted from said receiver optic fiber means to the corresponding detector photocell.

15. In an optical scanning system in accordance with claim 14 and including a source of voltage for said plurality of detector photocells and wherein each of said detector photocells is of the photoconductive type and is connected in series with a load resistor across said source of voltage and the resistance of each said load resistor is approximately equal to that of the corresponding photocell at a predetermined level of illumination, whereby said plurality of detector photocells respond substantially identically to the same level of illumination.

16. In an optical scanning system in accordance with claim 15 and including
means responsive to the outputs of at least two of said detector photocells for deriving a contrast signal whose magnitude is a function of the relative intensity of light received from different portions of said target, and
automatic gain control means receiving said contrast signal as an input for providing said source of voltage for said plurality of detector photocells, the gain of said automatic control means being inversely proportional to the magnitude of input signal thereto.

* * * * *